United States Patent [19]

Yamashita et al.

[11] Patent Number: 4,483,818
[45] Date of Patent: Nov. 20, 1984

[54] FUEL ASSEMBLY

[75] Inventors: Junichi Yamashita, Hitachi; Toshio Kawai, Machida; Michiro Yokomi, Naka, all of Japan

[73] Assignee: Hitachi, Ltd., Tokyo, Japan

[21] Appl. No.: 179,284

[22] PCT Filed: Feb. 19, 1979

[86] PCT No.: PCT/JP79/00038
§ 371 Date: Nov. 13, 1979
§ 102(e) Date: Nov. 13, 1979

[87] PCT Pub. No.: WO79/00742
PCT Pub. Date: Oct. 4, 1979

[30] Foreign Application Priority Data

Mar. 13, 1978 [JP] Japan ................... 53-28911

[51] Int. Cl.³ .............................. G21C 3/32
[52] U.S. Cl. .................... 376/435; 376/917
[58] Field of Search ............ 176/76, 78; 376/435, 376/917

[56] References Cited

U.S. PATENT DOCUMENTS 3,145,149  8/1964  Imhoff .
4,229,258 10/1980  Takeda et al. ............ 176/78 X
4,244,784  1/1981  Takeda et al. ............ 176/78 X

FOREIGN PATENT DOCUMENTS 14336  5/1975  Japan ........................ 176/78

Primary Examiner—Peter A. Nelson
Attorney, Agent, or Firm—Antonelli, Terry & Wands

[57] ABSTRACT

The axial power distribution of a nuclear reactor in a region of high burn-up degrees should desirably be flat. In consideration of the fact that void coefficients have a distribution in the axial direction, a mean infinite multiplication factor in an axially upper region of a reactor core is made lower than a mean infinite multiplication factor in a lower region. Especially, this becomes possible in such a way that a mean enrichment factor of fuel located in the uppr region is made lower than a mean enrichment factor of fuel located in the lower region.

4 Claims, 7 Drawing Figures

FIG. 3
FIG. 4
FIG. 5
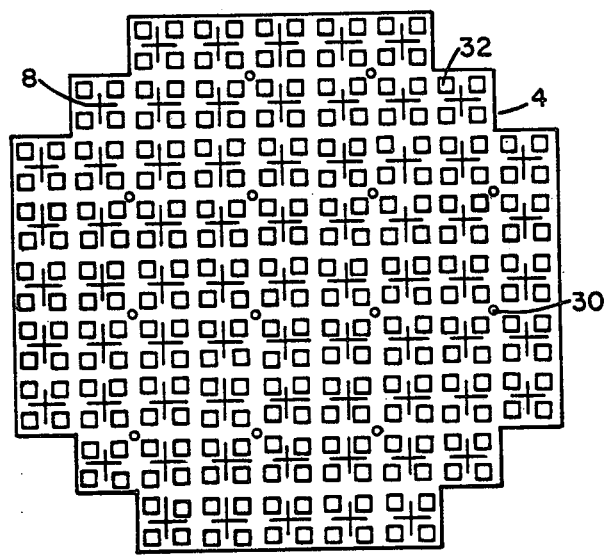
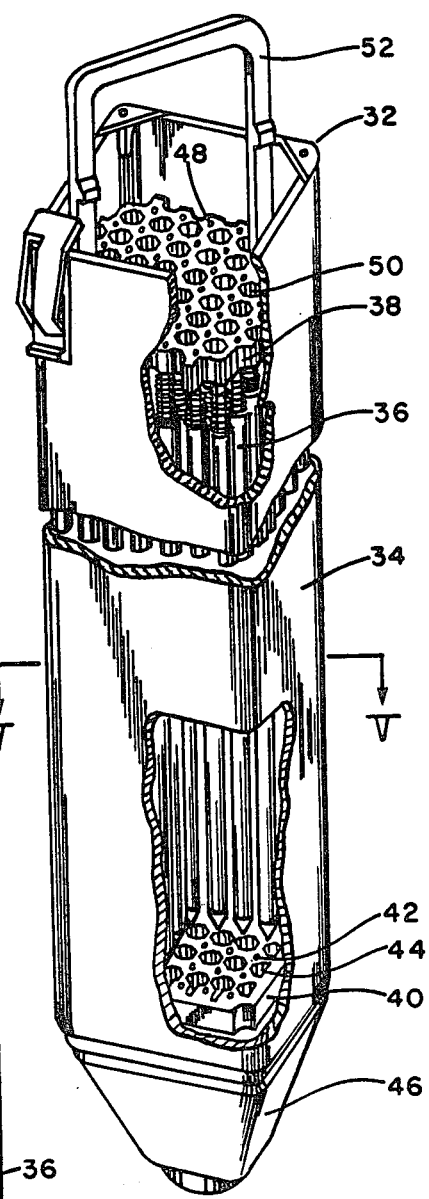
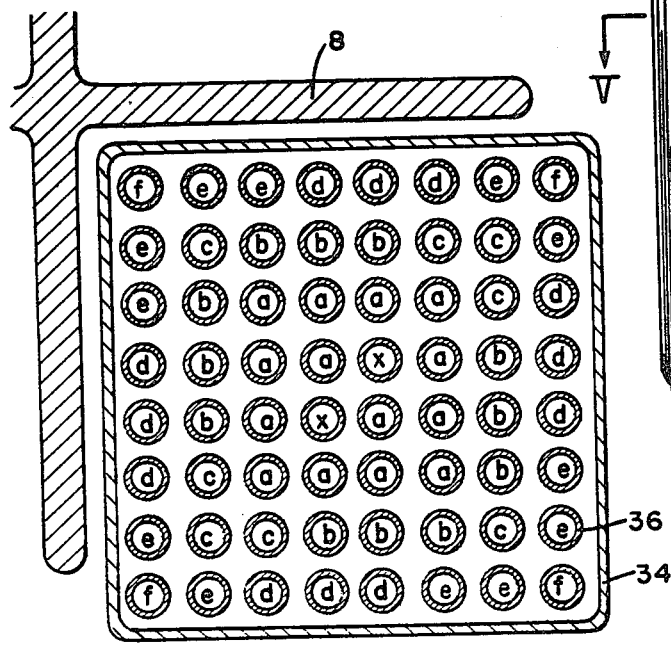

(3)

FUEL ASSEMBLY

DESCRIPTION

1. Technical Field

This invention relates to fuel assemblies, and more particularly to a fuel assembly suitable for enhancing the economy of fuel.

2. Background Art

The fuel of a boiling water reactor is received in a large number of long rod-shaped members. These fuel rods are held in the flow of the coolant within a reactor core with their longitudinal direction set vertical and at predetermined intervals from one another, and thus form a fuel assembly. The coolant is in the subcooled state in the lower part of the core which serves as an inlet for the coolant. As the coolant rises within the core, it becomes the states of subcooled boiling and saturated boiling. Therefore, the void coefficient increases from the lower part towards the upper part of the core, and it reaches approximately 70% in the upper part of the core serving as an outlet for the coolant (void distribution). As a result, the heating of neutrons proceeds more and the reactivity becomes higher in the lower part than in the upper part of the core, so that the position of a power peak arises in the lower part of the core. In the case where the power distribution is not uniform over the entire core, only a domain of the highest power operates at the highest efficiency, with the result that the mean power becomes lower than the theoretical value. Further, a larger and more expensive core and more fuel are required for a given power level. In order to minimize the cost of the fuel as well as the whole apparatus, it is desirable that the power distribution is flat in the axial direction.

In order to flatten the axial power distribution, the following method has been commonly practised. That is, by inserting control rods into the reactor core from the lower end of the core, the fuel reactivity (infinite multiplication factor $K_\infty$) in the lower part of the core is lowered so as to cancel the vertical unbalance of reactivities attributed to void coefficients.

On the other hand, the rate of plutonium production attendant upon the burn-up of the fuel rod is comparatively high in a void region, so that the deterioration of the reactivity attendant upon the burn-up becomes as illustrated in FIG. 1. In FIG. 1, a curve A indicates the reactivity deterioration in the upper part of the core, and a curve B the reactivity deterioration in the lower part of the core. In a region of low degree of burn-up indicated by L (a range in which the mean burn-up degrees of the fuel are from approximately 10,000 MWD/T to 18,000 MWD/T), the deterioration of the reactivity in the upper part of the core is smaller than the deterioration in the lower part of the core. In consequence, the difference between the reactivities in the upper and lower parts of the core tends to gradually decrease with the burn-up, and the power distribution as above stated flattens. In this manner, in the low burn-up degree region, the power distribution tends to flatten without making the reactivities unequal between the upper and lower parts of the core, and it can also be easily controlled with the control rod.

In contrast, in a region of high degree of burn-up indicated by H in FIG. 1 (in which the mean burn-up degrees of the fuel are at least 30,000 MWD/T), the difference between the reactivities in the upper part of the core and the lower part of the core tends to gradually increase. Therefore, the unbalance of the reactivities caused by the unequal void coefficients is canceled excessively, the reactivity in the upper part of the core becomes greater than that in the lower part of the core, and the power distribution becomes one having a power peak in the upper part of the core. Moreover, since the control rod is inserted into the core from the lower end of the latter in the boiling water reactor, the power difference in the upper and lower parts of the core becomes increasingly great, and so does the power peak value. The distortion of the power distribution in which the power peak appears in the upper part of the core spoils the safety of the reactor for the reason that when the control rods must be urgently inserted to shut down the reactor as in case of any accident of the reactor, it takes a long time before the manifestation of the reactivity suppressing effect of the control rods because the control rods have reached the region of high power. In this manner, in the high burn-up degree region, the power distribution cannot be flattened in case where the infinite multiplication factors in the upper and lower parts of the core are of a uniform distribution. Therefore, it has heretofore been inevitable to design the reactor core with a low degree of burn-up aimed at. From the viewpoint of the economy of the fuel, however, it is more desirable that the degree of burn-up of the fuel is as high as possible.

In order to flatten the power distribution of the core, the distribution of the fuel reactivities (infinite multiplication factors) may be varied. To this end, it has been proposed to vary the distribution of uranium enrichment factors in the fuel assembly or to vary the distribution of the concentrations of burnable poison within the fuel assembly. Japanese Laid-open Patent Application No. 8494/1976 discloses the distribution of uranium enrichment factors, while Japanese Published Patent Application No. 12793/1976 discloses the concentration distribution of burnable poison. In these known arts, however, the betterment of the power distribution in the high burn-up degree region is not referred to at all.

SUMMARY OF THE INVENTION

An object of this invention is to provide a fuel assembly which realizes the flattening of a reactor power distribution in a high burn-up degree region and which can enhance the economy of fuel.

A feature of this invention consists in that a mean infinite multiplication factor in an upper region in the axial direction of a fuel assembly is made lower than a mean infinite multiplication factor in a lower region. In particular, it is a feature that, to this end, a mean uranium enrichment factor in the upper part in the axial direction of the fuel assembly is made smaller than a mean uranium enrichment factor in the lower part.

BRIEF DESCRIPTION OF THE DRAWINGS

FIG. 3 is a schematic horizontal sectional view of a reactor core portion, FIG. 4 is a perspective view, partially in section, of a fuel assembly, FIG. 5 is a horizontal sectional view of the fuel assembly.

BEST MODE FOR CARRYING OUT THE INVENTION

Hereunder, an embodiment of this invention will be described with reference to FIGS. 2 to 7. In this embodiment, the uranium enrichment factor in a fuel assembly is varied in the upper part and lower part in the axial direction thereof, whereby an infinite multiplication factor in the upper part of a rector core and that in the lower part of the reactor core are made unequal, with the result that the axial power distribution of the reactor core is flattened.

Figure 1:
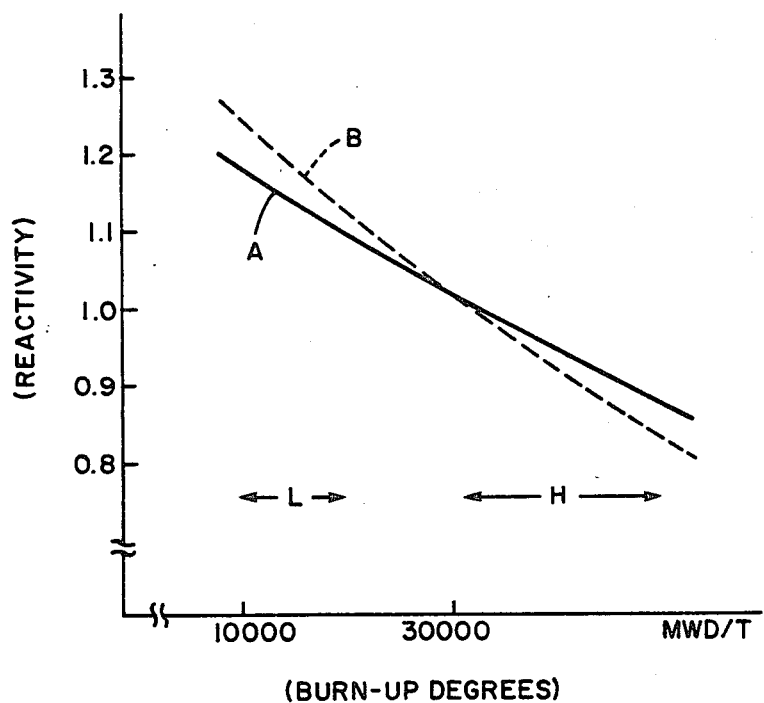
FIG. 1 is a graph showing reactivity deteriorations attendant upon burn-up in the upper part and lower part of the core of a boiling water reactor.
Figure 2:
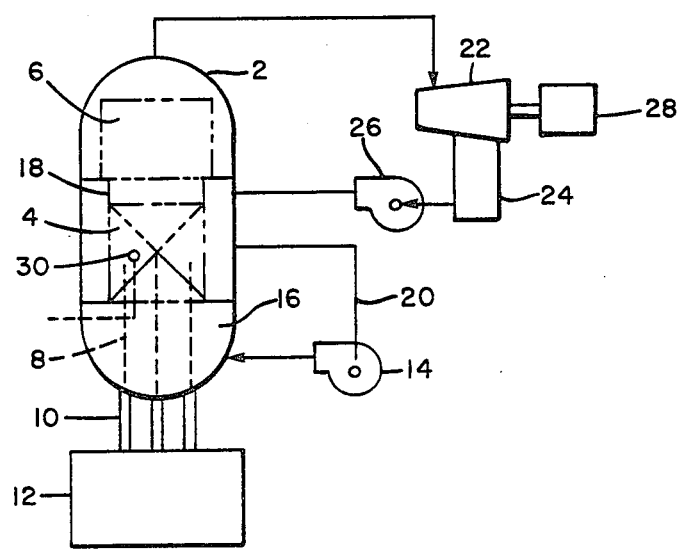
FIG. 2 is a schematic flow diagram of a power plant employing a boiling water reactor.

FIG. 2 shows the schematic system of a power plant employing a boiling water reactor. Referring to FIG. 2, a reactor core 4 is disposed in a reactor pressure vessel 2, and a steam separator and drier 6 is arranged above the core 4 within the reactor pressure vessel 2. A plurality of control rods 8 are coupled to control rod drivers 10. In order to regulate the power of the reactor, the control rod 8 is inserted into the core 4 and drawn out therefrom by the control rod driver 10. The control rod drivers 10 are coupled to a control rod driving control system 12, and effect the operations of the control rods 8 as stated above. The reactor pressure vessel 2 is filled with a coolant which amounts above the core 4. The coolant flows into a plenum 16 underlying the core 4 and a core shroud 18 surrounding the core 4 by means of a circulating pump 14. The circulating pump 14 is mounted on a pipe 20 of a recirculating system. Water vapor generated in such a way that the coolant is heated by a fuel assembly (not shown) arranged in the core 4 passes through the steam separator and drier 6, whereupon it is supplied to a turbine 22 and condensed by a condenser 24. The condensed water is returned into the reactor pressure vessel 2 by a feed pump 26. A dynamo 28 is coupled to the turbine 22. A neutron flux detector 30 is inserted in the core 4 so as to detect the power of the reactor.

FIG. 3 is a sectional plan view of the core 4 of the boiling water reactor. In the core 4, a large number of fuel assemblies 32 as shown in FIG. 4 are arranged, and the cruciform control rods 8 and the neutron flux detectors 30 are arranged among the fuel assemblies 32.

As shown in FIG. 4, the fuel assembly 32 is usually composed of a tubular channel 34 open at both the ends, fuel rods 36, an upper partition plate 38, a lower partition plate 40, etc. The tubular channel 34 has a substantially square sectional shape. The fuel rods 36 are supported by the lower partition plate 40, and their lower ends snugly fit in apertures 42 in the lower partition plate 40. The lower partition plate 40 is provided with a large number of openings 44. The coolant passes from a funnel-shaped portion 46 through the openings 44 into the tubular channel 34, to cool the fuel rods 36. The upper partition plate 38 is also provided with apertures 48 and openings 50. The fuel rods 36 snugly fit in the apertures 48. The coolant after having cooled the fuel rods 36 passes through the openings 50 and is taken out of the fuel assembly 32. The upper partition plate 38 is provided with a handle 52, which is used for manipulating the fuel assembly 32. The fuel rod 36 is made up of a pipe, and fuel pellets contained therein. One fuel rod has about 300 to 500 fuel pellets contained therein. In the fuel pellet, nuclear fuel such as enriched uranium dioxide ($UO_2$) is crammed. This invention has taken notice of the means enrichment factor of the fuel in all the fuel pellets located in the upper part of the core among the fuels in the fuel pellets and the mean enrichment factor of the fuel in all the fuel pellets located in the lower part of the core.

FIG. 5 is a V—V sectional view of the fuel assembly shown in FIG. 4. Numerals in FIG. 5 indicate the same components as indicated by the same numerals in the other drawings. Symbols a, b, c, d, e and f written in the respective fuel rods 36 indicate the classes of the uranium enrichment factors of the individual fuel rods 36. The six sorts of fuel rods have enrichment distributions as indicated in Table 1 in the upper and lower parts with the boundary at the axially central part.

TABLE 1

| | | Kind of fuel rod | | | | | | Mean uranium enrichment factor |
|---|---|---|---|---|---|---|---|---|
| | | a | b | c | d | e | f | |
| Uranium Enrichment Factor | Upper part of core (weight %) | 6.9 | 6.3 | 5.1 | 4.3 | 4.3 | 3.4 | about 5.0 weight % |
| | Lower part of core (weight %) | 6.9 | 6.9 | 5.1 | 5.1 | 4.3 | 3.4 | about 5.6 weight % |
| Number of fuel rods per fuel assembly | | 12 | 14 | 8 | 12 | 12 | 4 | |

As seen from Table 1, the mean enrichment factor in the upper part of the core is about 5.0 weight-%, while the mean enrichment factor in the lower part of the core is about 5.6 weight-%. The mean enrichment factor of the fuel assemblies is about 5.3 weight-%. Each of the fuel rods used had 400 fuel pellets. Only required is that the average value of the enrichment factors of uranium in the fuel pellets situated in the upper part of the core is about 5.0 weight-% and that the average value of the enrichment factors of uranium in the fuel pellets situated in the lower part of the core is about 5.6 weight-%, and the uranium enrichment factors in the individual fuel pellets may be in any distribution. However, in order to flatten the power distribution in the radial direction of the reactor, also the uranium enrichment factor distribution in the radial direction is subject to some extent of restriction.

In case of using the fuel assembly which has the axial distributions of uranium enrichment factors as indicated in Table 1, a mean infinite multiplication factor in the upper region of the fuel assembly is 1.10, and a mean infinite multiplication factor in the lower region is 1.16. It has been found that the boundary between the upper part and lower part of the fuel assembly should desirably be (8/24) to (13/24) from the lower end of the fuel assembly.

Figure 6:
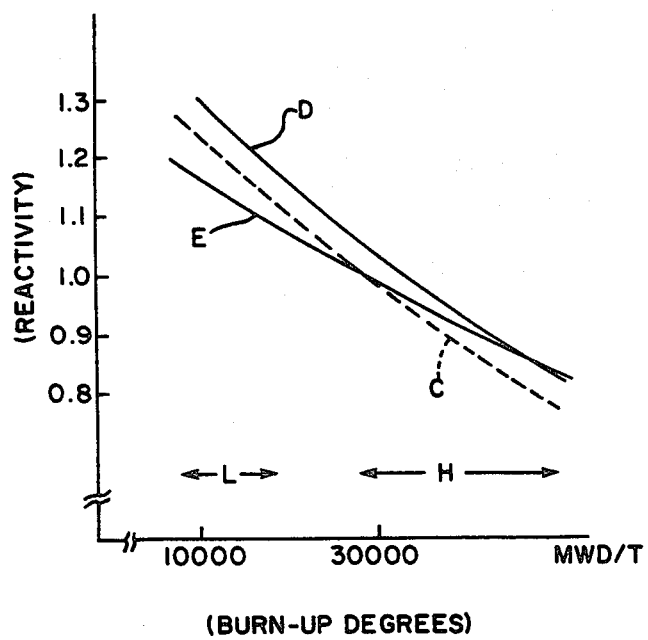
FIG. 6 is a graph showing reactivity deteriorations in the upper and lower parts of the core as to respective cases of using a prior-art fuel assembly and using a fuel assembly according to this invention.
Figure 7:
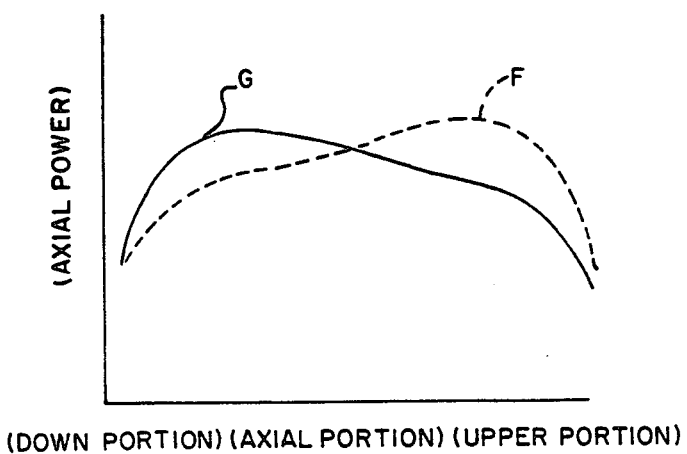
FIG. 7 is a graph showing axial power distributions in high burn-up degree regions as to the cases of using the prior-art fuel assembly and using the fuel assembly according to this invention.

In FIG. 6, solid lines indicate core reactivity characteristic curves in the case of loading the fuel assemblies indicated in Table 1 into the core of a boiling water reactor in which the void coefficient of the upper part of the core is larger than that of the lower part of the core, and a broken line indicates a core reactivity characteristic curve in the case of loading the prior-art fuel assemblies wherein the mean uranium enrichment factors of the upper part and lower part of the core are equal. The curve C indicates the reactivity characteristic of the lower part of the core according to the prior-art fuel assemblies, and the curve D the reactivity characteristic of the lower part of the core according to the fuel assemblies of this invention. The curve E indicates the characteristic of the upper part of the core, and the characteristic was the same in both the cases of the prior art and this invention. As apparent from FIG. 6, in the case of using the fuel assemblies according to this invention, the reactivities of the lower part of the core are raised as a whole, and the reactivity in the upper part of the core does not become greater than the reactivity in the lower part in a high burn-up degree region. As a result, as illustrated in FIG. 7, an output peak does not appear in the upper part of the core. More specifically, when the prior-art fuel assemblies are used, the reactivity in the upper part of the core becomes greater than that in the lower part in the high burn-up degree region, and hence, an output peak appears in the upper part of the core as illustrated by a curve F in FIG. 7. In contrast, when the fuel assemblies according to this invention are used, the output peak appears in the lower part of the core even in the high burn-up degree region as illustrated by a curve G, and the output distribution becomes flat as a whole and easily controllable with control rods.

What is claimed is:

1. A fuel assembly comprising a plurality of fuel rods which, at the initial time of assembly of the fuel rods into the fuel assembly, are (1) new, having not been previously utilized in a nuclear reactor core, and (2) vertically arranged in an axial direction in a manner that the mean infinite multiplication factor of an upper region of the fuel assembly in the core is lower in relationship to the mean infinite multiplication factor of a lower region, whereby said fuel assembly is sufficiently different in said two regions to avoid a power output peak in an upper part of the reactor core in any region of high burn-up degree where the mean burn-up of fuel is higher than 30,000 MWD/T.

2. A fuel assembly as defined in claim 1, characterized in that a mean enrichment factor of fuel located in the upper region in the axial direction of said fuel assembly is made lower than a mean enrichment factor of fuel located in the lower region.

3. A fuel assembly as defined in claim 1 or claim 2, characterized in that a boundary between the upper region and lower region in the axial direction lies between (8/24) to (13/24) of a total length of said fuel assembly from a lower end thereof.

4. A fuel assembly according to claim 1, wherein the arrangement of the fuel rods in the fuel assembly is retained unaltered from said time of assembly until substantially complete depletion thereof.

* * * * *